US008391881B2

(12) United States Patent (10) Patent No.: US 8,391,881 B2
Huttunen et al. (45) Date of Patent: Mar. 5, 2013

(54) METHOD AND APPARATUS TO OPERATE A COGNITIVE RADIO IN A CROWDED COLLABORATIVE SYSTEM

(75) Inventors: Anu Huttunen, Helsinki (FI); Aarno Pärssinen, Espoo (FI)

(73) Assignee: Nokia Corporation, Espoo (FI)

(*) Notice: Subject to any disclaimer, the term of this patent is extended or adjusted under 35 U.S.C. 154(b) by 1181 days.

(21) Appl. No.: 12/012,726

(22) Filed: Feb. 4, 2008

(65) Prior Publication Data

US 2009/0197626 A1    Aug. 6, 2009

(51) Int. Cl.
*H04W 72/00* (2009.01)
*H04B 17/00* (2006.01)

(52) U.S. Cl. .............. 455/454; 455/515; 455/67.11; 455/115.1

(58) Field of Classification Search ............ 455/454, 455/515, 67.11, 115.1
See application file for complete search history.

(56) References Cited

U.S. PATENT DOCUMENTS

| 5,907,812 | A  | * | 5/1999  | Van De Berg    | 455/461 |
| 7,299,042 | B2 | * | 11/2007 | Moore et al.   | 455/434 |
| 7,450,947 | B2 | * | 11/2008 | Kuffner et al. | 455/447 |
| 2007/0091998 | A1 | * | 4/2007 | Woo et al.    | 455/454 |

FOREIGN PATENT DOCUMENTS

| GB | 2431548 A      | 4/2007 |
| WO | WO-2007034461 A | 3/2007 |

OTHER PUBLICATIONS

"An Efficient Blind Modulation Detection Algorithm forf Adaptive OFDM Systems", Sharath B. Reddy et al., IEEE 2003, pp. 1895-1899.
"Likelihood Ratio Tests for Modulation Classification", Prokopios Panagiotou et al., IEEE 2000, pp. 670-674.
"Constellation Shape as a Robust Signature for Digital Modulation Recognition", Bijan G. Mobasseri, IEEE 1999, pp. 442-446.
"Blind-Detection Assisted Sub-Band Adaptive Turbo-Coded OFDM Schemes", T. Keller, L. Hanzo, IEEE 1999, pp. 489-493.
"Cyclostationary Signatures for Rendezvous in OFSM-based Dynamic Spectrum Access Networks", Sutton, P.D., et al., IEEE 2007, pp. 220-231.
Loig Godard et al; "Dynamic Spectrum Access with Cognitive Radios: Future Architectures and Research Challenges;" Cognitive Radio Oriented Wireless Networks and Communications, 2006. 1st International Conference on IEEE, PI, Jun. 1, 2006, pp. 1-5, XP031091955.
Stine J A: "Spectrum Management: the killer application of ad hoc and mesh networking;" IEEW International Symposium on New Frontiers in Dynamic Spectrum Access Networks, Nov. 8, 2005; pp. 184-193, XP010855115.

* cited by examiner

*Primary Examiner* — Wen Huang
(74) *Attorney, Agent, or Firm* — Harrington & Smith

(57) ABSTRACT

In a cognitive radio environment with at least three cognitive radio terminals, terminals 1 and 2 have an active link. Terminal 3 estimates the link quality, and if it is deemed good terminal 3 transmits over the frequency band in use on the link. Terminal 3 then monitors the link between terminals 1 and 2 to quantify its interference on it. If no interference is detected terminal 3 can increase its power. If terminals 1 and 2 change their modulation terminal 3 deems its interference too severe and either reduces power or finds another frequency band. Terminal 3 can use blind modulation detection for the link between terminals 1 and 2, and estimate link quality based on the type of modulation in use.

27 Claims, 5 Drawing Sheets

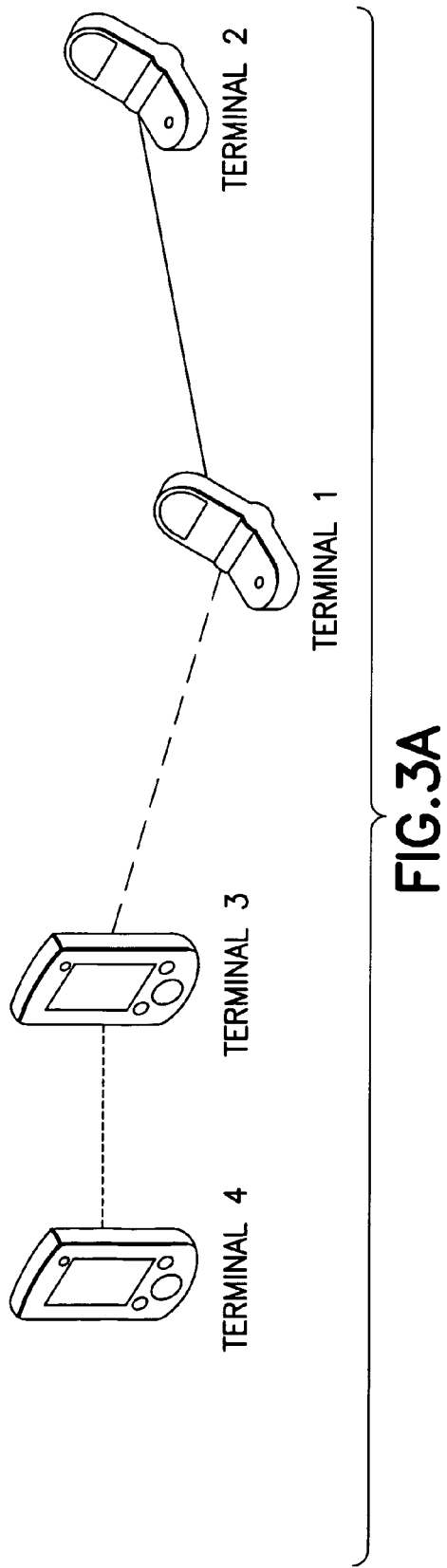
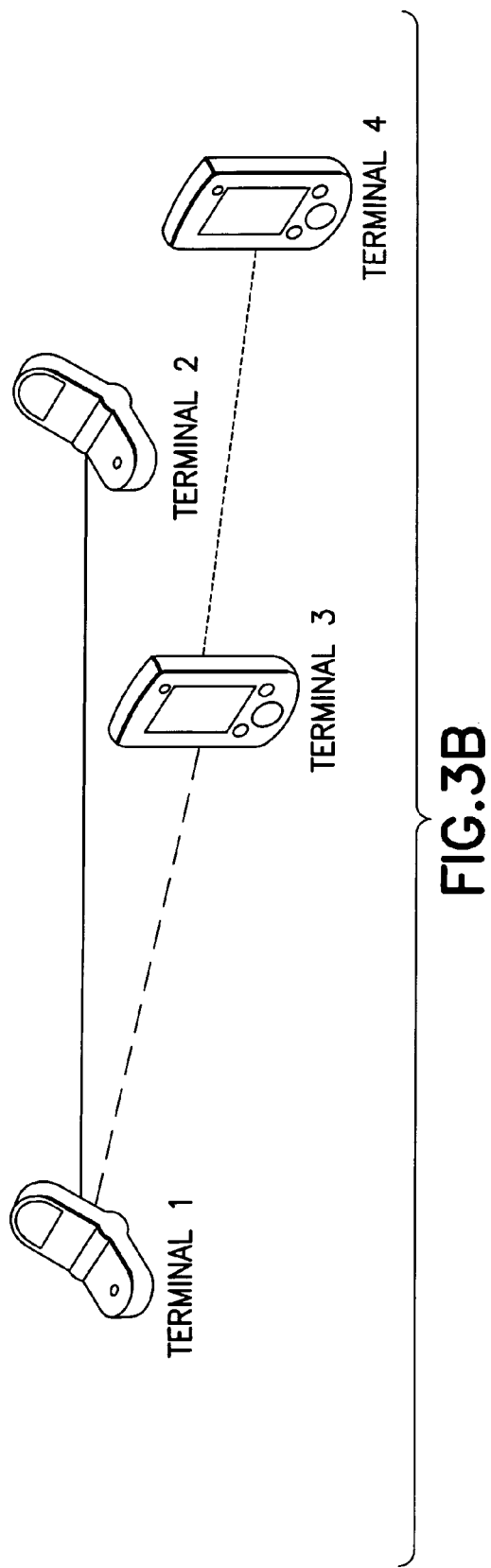
FIG.3A
FIG.3B

METHOD AND APPARATUS TO OPERATE A COGNITIVE RADIO IN A CROWDED COLLABORATIVE SYSTEM

TECHNICAL FIELD

The teachings herein relate generally to wireless networks and devices operating among such networks, and are particularly related to cognitive radios that operate opportunistically using portions of the spectrum not currently in use by networks that have designated radio resources, with little or no interference to those other networks.

BACKGROUND

Spectrum sensing is needed in cognitive radios to find empty slots in the radio spectrum which can subsequently be used in an opportunistic manner. The cognitive radio must be able to detect a primary user at a low power level and avoid causing interference to it. Generally it is assumed to use the actual mobile terminals operating within the network as the cognitive radios that also sense the spectrum quality. There are various proposals by which cognitive radios may find the spectrum that is available for use, and these teachings proceed from the assumption that the cognitive radios have indeed found some available spectrum that they can use without interfering with the existing networks (which may be hierarchical or ad-hoc) that are specifically authorized to use a portion of the universe of radio spectrum. Development of cognitive radio systems is at an early stage, and come cognitive radio systems may have a specific spectrum band allocated and may even have some central node. Regardless of whether radio spectrum bands are allocated only to the primary network systems or additionally to the cognitive system, the cognitive radio terminals themselves use the frequencies within a spectrum band opportunistically.

Term the radios operating in those primary networks with frequency resources assigned to users as the primary users, and term the cognitive radios that use frequency resources on an opportunistic basis as the secondary users. The secondary users are obliged to avoid the frequencies that the primary users are using, which is by definition why they are cognitive radios; they must find the spectrum that is available for use. Among the secondary users the spectrum must be used in such a way that the transmission of one secondary system (e.g., a pair of cognitive radio terminals communicating with one another) is minimally interfering the transmission of another secondary system. All of these secondary users are equal in status as far as spectrum usage is concerned; they compete against each other to find a part of spectrum where to operate.

There arise instances where the spectrum might be so crowded that a secondary user is incapable of finding an empty spectrum slot for its use. This may occur for example if the primary users occupy a particularly large proportion of their network's spectrum leaving little to cognitive users to exploit, or if there are a large number of simultaneous cognitive users so that the competition for the exploitable spectrum is tight. Since the cognitive radios/users in such a scenario are equal in rank and by definition for a cognitive system there is no hierarchy by which to allocate the scarce exploitable spectrum, this leads to a problem. How does one cognitive radio get an opportunity to transmit, and particularly in a manner that does not interfere with other cognitive users who may or may not already be communicating? Without some solution the result would appear to be that there would be multiple interferences among the equal secondary users, wasting the scarce spectrum available and exacerbating the problem. These teachings are directed to resolving that problem.

SUMMARY

In accordance with one embodiment of the invention there is a method that includes, at a third communication terminal, determining link quality for a frequency band in use between a first communication terminal and a second communication terminal, deciding based on the link quality that the frequency band can support another user, and thereafter autonomously transmitting within the frequency band from the third communication terminal.

In accordance with another embodiment of the invention there is an apparatus that includes a receiver, a processor, and a transmitter. The receiver is configured to receive information about a link between a first communication terminal and a second communication terminal. The processor is configured to determine from the received information link quality for a frequency band in use on the link, and to autonomously decide based on the link quality that the frequency band can support another user. The transmitter is configured to transmit within the frequency band based on the decision.

In accordance with another embodiment of the invention there is a computer readable memory embodying a program of machine-readable instructions executable by a digital data processor to perform actions directed toward determining when to transmit autonomously. In this embodiment the actions include, at a third communication terminal, determining link quality for a frequency band in use between a first communication terminal and a second communication terminal, and deciding based on the link quality that the frequency band can support another user and thereafter autonomously transmitting within the frequency band from the third communication terminal.

In accordance with another embodiment of the invention there is an apparatus that includes receiving means for receiving information about a link between a first communication terminal and a second communication terminal; processing means for determining from the received information link quality for a frequency band in use on the link, and to autonomously decide based on the link quality that the frequency band can support another user; and transmitting means for transmitting within the frequency band based on the decision. In a particular embodiment, the receiving means is a receiver, the processing means is a processor, and the transmitting means is a transmitter.

These and other aspects of the invention are detailed more particularly below.

BRIEF DESCRIPTION OF THE DRAWINGS

The foregoing and other aspects of these teachings are made more evident in the following Detailed Description, when read in conjunction with the attached Drawing Figures.

FIGS. 3A-3B are pictorial diagrams of two different use scenarios for illustrating an aspect of the invention where quality of the link between terminals 1 and 2 is re-estimated to determine extent of interference caused to it by communications between terminals 3 and 4.

DETAILED DESCRIPTION

Figure 1:
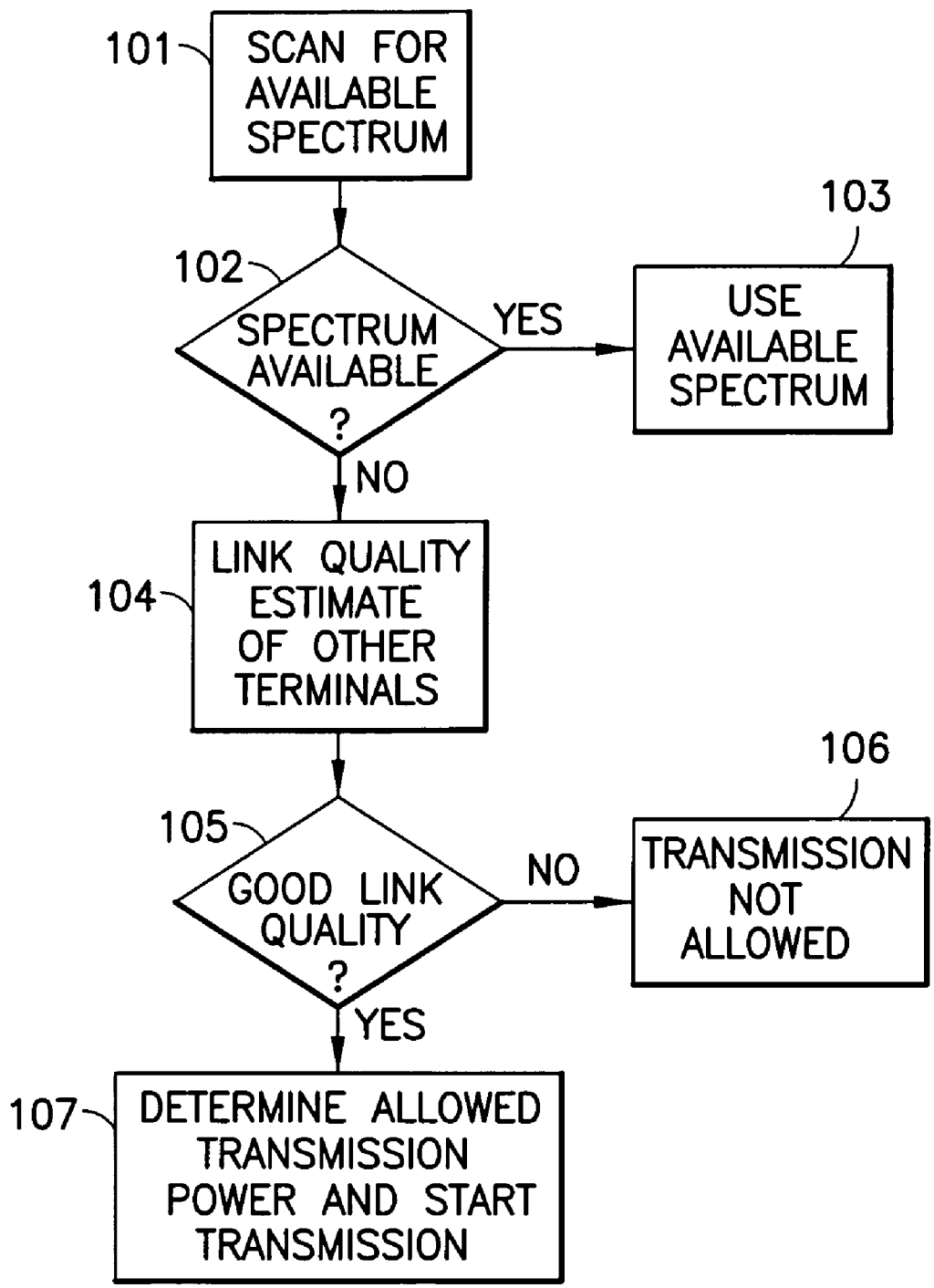
FIG. 1 is a schematic process flow diagram of the secondary user's decision process to allow for two secondary users to operate simultaneously.

Further to the problem formulated above, embodiments of this invention provide a method for finding a part of spectrum where another secondary user is transmitting and use it in a way that that secondary user is not severely disturbed/interfered with. According to these teachings, two secondary users can operate in one part of the spectrum simultaneously, thus enhancing the spectrum efficiency of the cognitive radio system. This improves the collaborative operation of a cognitive radio system.

Consider three cognitive radio terminals, communication terminal 1, communication terminal 2, and communication terminal 3. Each employs adaptive modulation, which means that with good link quality, the respective terminal would use one modulation (for example 64 QAM modulation) and with bad link quality the terminal would use a different modulation (for example QPSK modulation).

According to an aspect of these teachings, the cognitive radio terminal determines the link quality between two other cognitive radio terminals and based on the knowledge of the link quality decides whether it can use the same frequency band. For example, if the communication between terminals 1 and 2 is observed to be operating over a good-quality link, terminal 3 can use the same frequency band in such a way that the link quality between terminals 1 and 2 is reduced but they are still able to operate by changing the modulation.

There are several ways in which the third terminal can determine the link quality. In one embodiment, the link quality between terminals 1 and 2 can be estimated by terminal 3 by terminal 3 detecting the modulation or other signal properties that it is using. For example, if QPSK is used in the link between terminals 1 and 2, terminal 3 detects that modulation and estimates the link quality to be bad. On the other hand, if terminal 3 detects that 64 QAM is used, it estimates the link quality is good. In the latter case where link quality is estimated to be good, it is a reasonable assumption by terminal 3 that the link between terminals 1 and 2 has sufficient overhead in the signal transmission, and if the link is somehow interfered by an additional transmission from terminal 3 itself, that interference can be reduced by terminals 1 and 2 adaptively reducing the data rate and adjusting their transmission to a lower data rate. As will be detailed below, once terminal 3's communications interfere to the extent that terminals 1 and 2 change their modulation, terminal 3 can conclude its interference is too extensive and take measures to mitigate or eliminate that interference. Terminal 3 can for example estimate the link quality by using blind modulation detection algorithms known in the art. As an example, such algorithms are detailed at the following papers:

"An Efficient Blind Modulation Detection Algorithm for Adaptive OFDM Systems", S. B. Reddy, T. Yucek, and H. Arslan, IEEE 58$^{th}$ Vehicular Technology Conference, 6-9 Oct. 2003, Vol. 3, pp. 1895-1899.

"Likelihood ratio tests for modulation classification", P. Panagiotou, A. Anastasopoulos, and A. Polydoros, MILCOM 2000. 21st Century Military Communications Conference Proceedings, 22-25 Oct. 2000, Vol. 2, pp. 670-674.

"Constellation shape as a robust signature for digital modulation recognition", B. G. Mobasseri, IEEE Military Communications Conference Proceedings, MILCOM 1999, 31 Oct.-3 Nov. 1999, Vol. 1, pp. 442-446.

"Blind-detection assisted sub-band adaptive turbo-coded OFDM schemes", T. Keller and L. Hanzo, IEEE 49th Vehicular Technology Conference, 16-20 May 1999, Vol. 1, pp. 489-493.

In another implementation, the third terminal can determine the link quality by link quality reports it receives from other cognitive users such as terminals 1 and/or 2. Such link quality reports can be sent periodically from the active cognitive users or terminal 3 can demand/request a particular cognitive user to send such a report, such as by using a control channel that the cognitive users monitor. The availability of such link quality reports to terminal 3 depends on the particular collaboration scheme in use among the secondary users and can vary from time to time and in different geographic areas.

Further, these teachings address continuing functions following the first transmission by terminal 3 once it determines that there is excess overhead in the channel between terminals 1 and 2. Assume terminal 3 sends its transmission to a fourth terminal, terminal 4, and uses the same frequency band as was in use between terminals 1 and 2 and for which terminal 3 determined the link was of good quality. Once terminal 3 has started the transmission in the same frequency band where terminal 1 was already operating on, one or more communication parameters (e.g., transmit power, data rate, modulation, etc.) of terminal 1 are detected. To allow a straightforward comparison, terminal 3 also detected this/these same communication parameters from terminal 1 prior to that first transmission from terminal 3 to terminal 4, and stored the results in its local memory. Now with the measurements of the terminal 1 parameter both before and after the terminal 3 transmission to terminal 4, terminal 3 is able to gage the effects of its transmission on terminal 1 and conclude whether it interfered in a substantial way. For example, if terminal 1 increases its transmission power or reduces its data rate, terminal 3 can conclude the amount of interference it is causing to terminal 1. This gives an opportunity to make autonomous decisions in the terminal 3 device and thus boost the overall spectral efficiency when more advanced collaborative means are not available.

Terminal 1 need not be wholly passive to the newly transmitting terminal 3 though. According to another aspect of the invention, the other cognitive terminal (terminal 1) has an opportunity to complain to terminal 3 after terminal 3 has started to transmit in the same frequency channel. This might become important if, for example, the service of terminal 1 requires using the highest modulation. In that case the lower modulation is not really available in a practical sense to terminal 1; while terminal 3 might have concluded that there is excess system capacity there is in fact not because terminal 1 needs the higher modulation to obtain the necessary data rate and the transmission from terminal 3 caused undue interference. Terminal 1 can send a complaint, which can be any form of an indication that the terminal 3 transmission caused interference, to terminal 3. This complaint message can be sent over a fixed control channel, which is available in some cognitive radio system architectures. Or terminal 1 can send the complaint message to terminal 3 via an alarm service through its own transmitted signal. An example of communicating between secondary users when there is no fixed control channel is seen at a paper entitled "Cyclostationary Signatures for Rendezvous in OFDM-Based Dynamic Spectrum Access Networks", by P. D. Sutton, K. E. Nolan, and L. E. Doyle, 2nd IEEE International Symposium on New Frontiers in Dynamic Spectrum Access Networks, DySPAN 2007, 17-20 Apr. 2007, pp. 220-231.

The cognitive radio terminal having this functionality to enhance the spectrum efficiency can work for example as shown at FIG. 1. At block 101, the user has a spectrum scanning capability in order to be able to find empty spectrum slots. This is most likely to be implemented in some cognitive terminals such as the example terminal 3. At block 102 the terminal finds spectrum that is not in use by users on a primary network, and if it is available the cognitive radio/terminal 3 uses it at block 103. We proceed from the assumption that it is not available and follow block 102 to block 104, the secondary users' link quality estimation stage where terminal 3 estimates link quality of a communication between terminals 1 and 2, which are two other cognitive users. They cannot be primary users because embodiments of these teachings will have them adapt their modulation to make room for terminal 3, whereas a secondary user/terminal 3 would not be allowed to cause such a change to primary users of a network that has specific radio resources allocated to it. As noted above, the link quality can be determined by blind modulation detection techniques (estimates) or by exchanging information about the link quality (more exact). If the decision at block 105 is that the link is not good (no excess capacity), then at block 106 terminal 3 concludes it cannot transmit on that frequency band, at least not at this time. If instead at block 105 the decision at terminal 3 is that the link is good, then at block 107 terminal 3 determines a proper transmission power and sends its transmission.

Figure 2A:
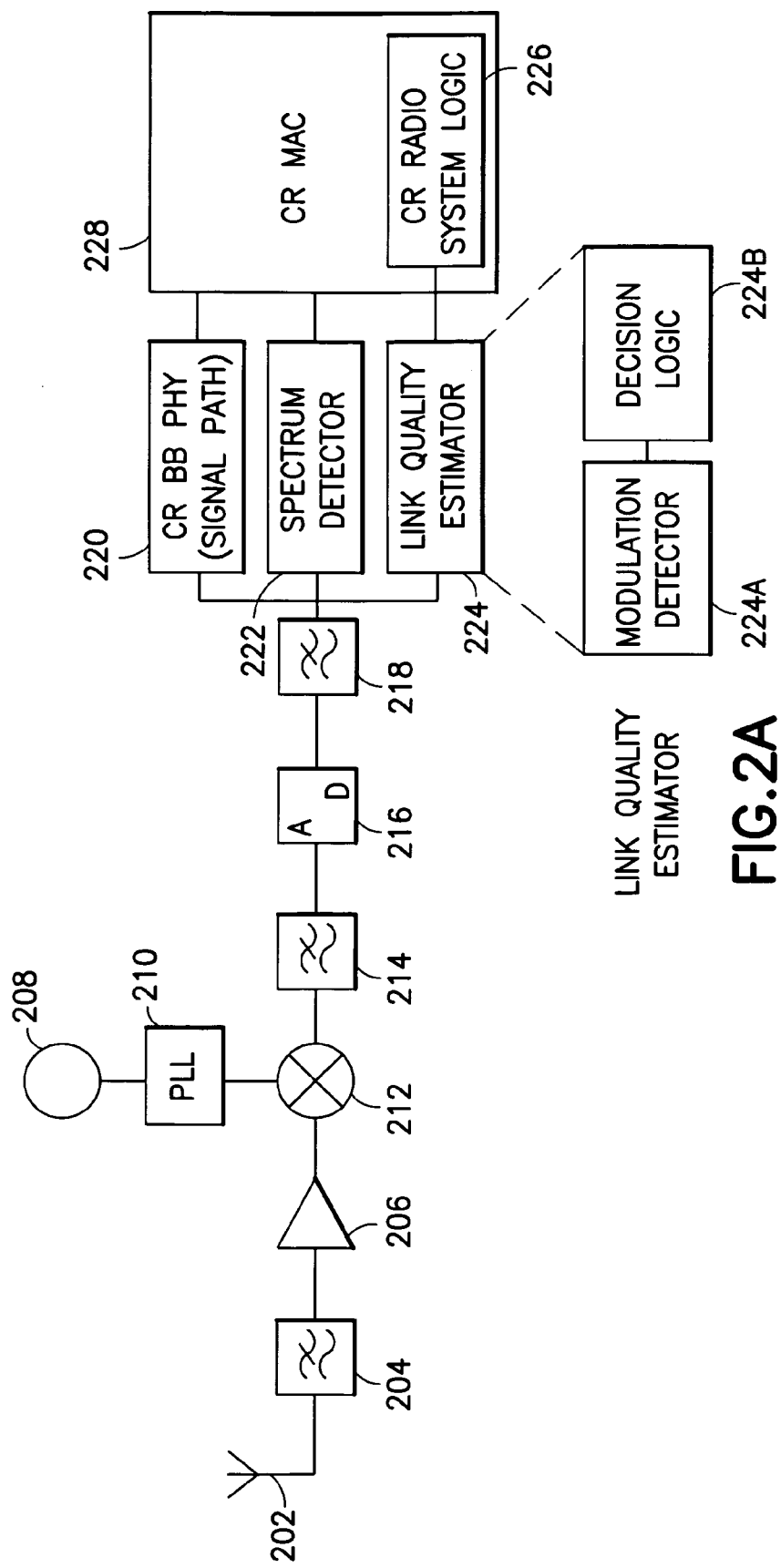
FIG. 2A is a block diagram of receiver functional blocks including a link quality estimator according to an embodiment of the invention.

One exemplary and non-limiting hardware implementation is shown at FIG. 2A, which is limited only to the receiver side of the cognitive radio terminal. Wireless signals are sent from and received at one or more antennas 202 of the cognitive radio terminal 200, filtered at a passband filter 204 and increased in power at a power amplifier 206. An oscillator 208 drives a phase locked loop circuit 210 to downconvert at a mixer 212 the received signal to intermediate frequency or baseband frequency, depending on the particular receiver architecture (baseband architecture shown). The baseband signal is then passed through a first low-pass filter 214, converted to digital at an analog to digital converter 216, and passed through another low pass filter 218 where it is finally split among three functional blocks. A cognitive radio baseband physical block 220 is used to measure the communication parameters such as from terminal 1 transmissions for the purposes of the terminal 200 determining whether it interfered with terminal 1 too much, as noted above. The spectrum detector block 222 is for detecting whether there is spectrum available for secondary/cognitive users. The link quality estimator 224 is in this embodiment comprised of two sub-blocks: a modulation detector 224A and decision logic 224B to decide whether the link is good or bad based on the detected modulation in use between terminals 1 and 2. As noted above, the modulation detector 224A can be realized using blind modulation detection algorithms such as those known in the art or yet to be developed. Such algorithms can be implemented for example with custom application specific integrated circuits ASICs, programmable logic (filed programmable gated array FPGA) or with a computer program stored on a local memory 232 of the terminal 200. Due to the reasonably high computing requirements the two first options are deemed the more practical implementations at the current time given the state of with existing silicon technologies. The decision logic 224B makes the decision about the link quality of the terminal. Using the knowledge of the link quality the actions undertaken in terminal 3 (the described terminal 200) is output to the cognitive radio system logic 226 in the cognitive radio MAC (medium access control) layer 228 or in the PHY (physical) layer, depending on the response speed requirements.

Figure 2B:
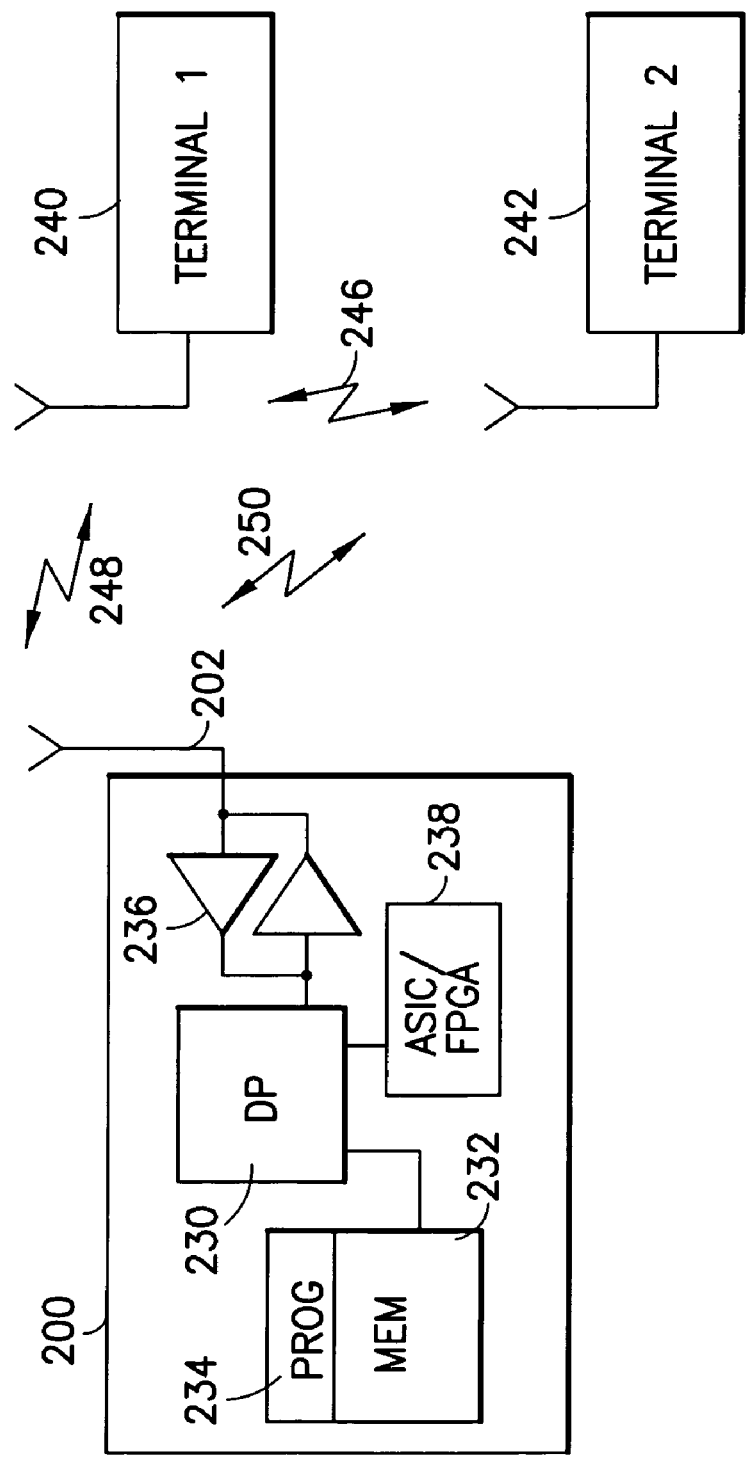
FIG. 2B is a high level schematic block diagram of a cognitive radio terminal in relation to two other cognitive terminals and not employing use of any kind of access node.

FIG. 2B shows a high level block diagram of terminal 3 (200) in the context of terminals 1 (240) and 2 (242) that operate without a network access node. These terminals 200, 240, 242 are cognitive radios operating on an opportunistic basis and not according to a network protocol that relies on network-dedicated radio resources. The cognitive radio terminal 200 includes a data processor (DP) 230, a memory (MEM) 232 that stores a program (PROG) 234, and a suitable radio frequency (RF) transceiver 236 coupled to one or more antennas 202 (one shown) for bidirectional wireless communications over one or more wireless links 248, 250 with the other cognitive users 240, 242. The link quality estimator 224 may be embodied as a software PROG 234 stored in the local MEM 232 of the terminal 200, or as an ASIC/FPGA 238 coupled to or as a part of the DP 230. Also shown in FIG. 2B is the link 246 between those other two cognitive users 240, 242 for which the quality is determined by the third terminal 200, such as by blind modulation estimation. It is understood that the other terminals 240, 242 also have similar hardware as is shown for the third terminal 200, and they may also have the link quality estimator 224 shown in FIG. 2A though it is not necessary that they do for operation of only the third terminal 200.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The PROG 234 is assumed to include program instructions that, when executed by the DP 230, enable the cognitive radio terminal 200 to operate in accordance with the exemplary embodiments of this invention, as detailed above. Inherent in the DP 230 is a clock (which can be the oscillator 208) to enable synchronism among the various terminals, which is important in some cognitive radio architectures. The PROG 234 may be embodied in software, firmware and/or hardware, as is appropriate. In general, the exemplary embodiments of this invention may be implemented by computer software stored in the MEM 232 and executable by the DP 230 of the terminal 200, or by hardware, or by a combination of software and/or firmware and hardware in the terminal 200.

In general, the various embodiments of the terminal 200 can include, but are not limited to, mobile terminals/stations, cellular telephones, personal digital assistants (PDAs) having wireless communication capabilities, portable computers (e.g., laptops) having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions and sensor networks.

The MEM 232 may be of any type suitable to the local technical environment and may be implemented using any suitable data storage technology, such as semiconductor-based memory devices, magnetic memory devices and systems, optical memory devices and systems, fixed memory and removable memory. The DP 230 may be of any type suitable to the local technical environment, and may include one or more of general purpose computers, special purpose computers, microprocessors, digital signal processors (DSPs) and processors based on a multi-core processor architecture, as non-limiting examples.

Recall the exemplary scenario above where terminal 1 is operating in a frequency band and terminal 3 wants to use the same part of the spectrum without blocking the transmission of terminal 1. Terminal 3 detects that terminal 1 is using for example 64 QAM. Thus terminal 3 knows that the link quality of terminal 1 is good and the power level of the terminal 3 can be tuned low enough to not affect terminal 1 or to raise the interference level of terminal 1 in a way that terminal 1 switches to for example to 16 QAM. The transmission quality of terminal 1 is somewhat lowered but on the other hand terminal 3 can operate simultaneously.

FIGS. 3A-3B shows two exemplary use scenarios. In each, terminal 1 is communicating with terminal 2 and terminal 3 is estimating the link quality between them in order to be able to communicate to terminal 4. In the case where the link quality between terminals 1 and 2 is estimated to be good enough that they can be disturbed as in FIG. 3A, the communication between terminals 3 and 4 is more likely not to disturb the communication between terminals 1 and 2 in a dramatic manner and thus the operation in the same frequency band can be tolerated. In FIG. 3B the communication between terminals 3 and 4 can cause an intolerable amount of interference to the communication between terminals 1 and 2. In order to be aware of which situation is in question one can use the additional feature to the invention which is explained above with reference to terminal 3 measuring some communication parameter of terminal 1 both before and after terminal 3's transmission. This is shown in FIG. 4.

Figure 4:
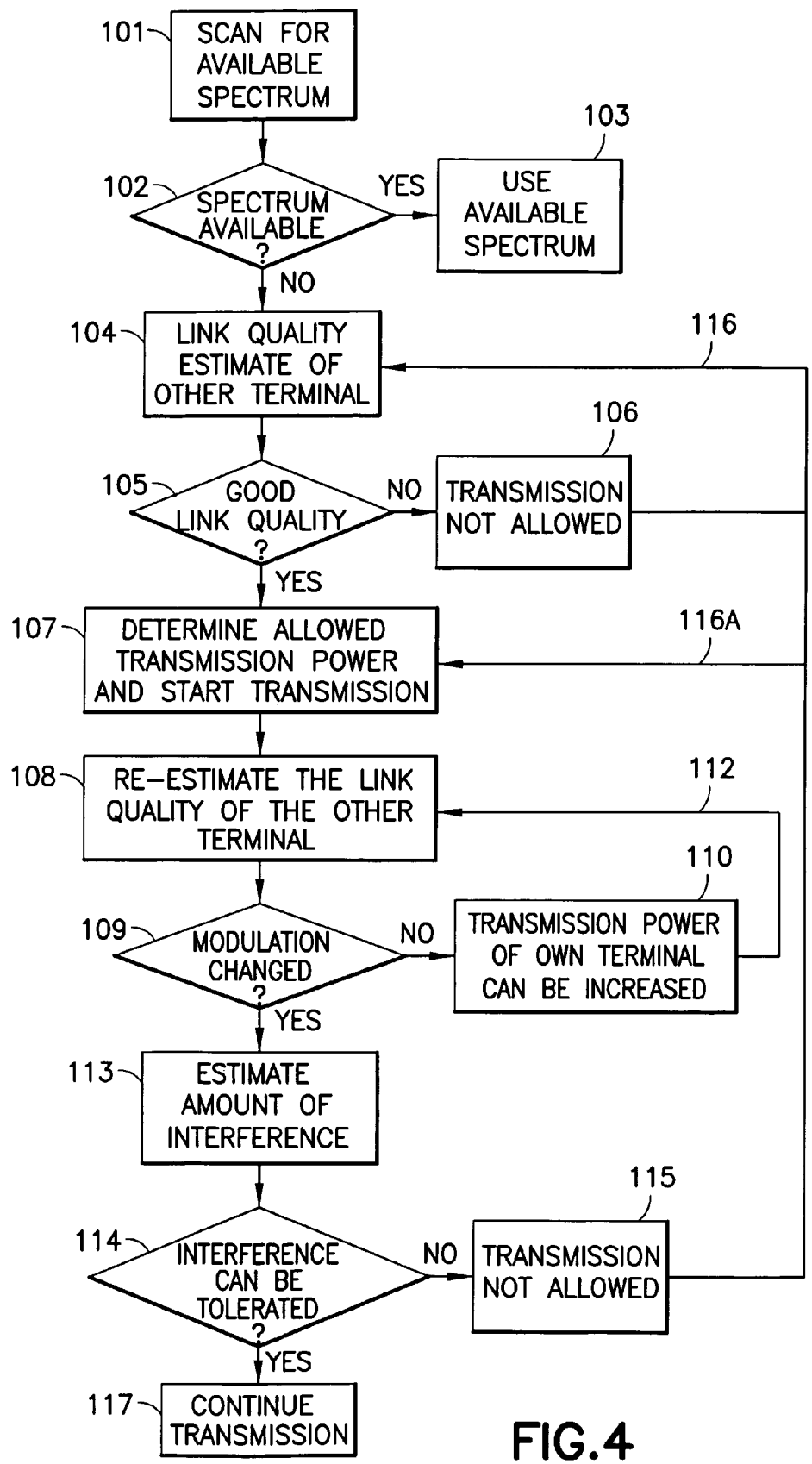
FIG. 4 is a schematic process flow diagram showing an additional feature of concluding the amount of interference that is caused to the other cognitive terminal according to an embodiment of the invention.

The upper portion of FIG. 4 is identical to FIG. 1 with the exception of a feedback loop, and so blocks 101 through 107 will not be detailed further. FIG. 4 continues where FIG. 1 left off at block 108, where terminal 3 re-estimates the link quality of the link between terminals 1 and 2 using the link quality estimator 224, but this re-estimation it is after terminal 3 starts its own transmission (between terminals 3 and 4) at block 107. If in fact the modulation used by terminal 1 has not changed at block 109, then at block 110 terminal 3 can increase its transmission power and the link between terminals 1 and 2 can again be checked at block 108, via the feedback line 112, to see if the increase in power has caused a change to terminal 1's modulation. At some point terminal 1 will change its modulation and so block 109 will lead to block 113, where a more quantitative decision on the amount of interference is made as to the effect of the terminal 3 transmission on the link between terminals 1 and 2. This can be done for example in the following manner:

Modulation that the terminal 1 is using has not changed after terminal 3 has started to communicate to terminal 4 terminal 3 is not causing any significant amount of interference.

Modulation that terminal 1 is using has reduced from 64 QAM to 16 QAM terminal 3 is causing a moderate amount of interference.

Modulation that terminal 1 is using has reduced from 64 QAM to QPSK terminal 3 is causing a significant amount of interference.

The above three examples quantify the amount of interference as not significant, moderate, and significant. These can be associated with a decision at block 114 whether the interference can be tolerated or not, wholly within the terminal 200 and without feedback from terminals 1 or 2 (though some embodiments noted above do use a feedback mechanism to complain to terminal 3 if interference is excessive). In one implementation moderate interference can be the threshold by which interference is considered intolerable, and in another embodiment only a significant amount of interference can be considered the intolerable threshold. If interference is determined as tolerable, then transmissions are continued at block 117. If not, then at block 115 further transmissions from terminal 3 are not allowed and one of two courses is possible. Feedback loop 116A is for the special case where terminal 3 increased its transmission power at block 110 to the point where the interference was not tolerable. In that case terminal 3 might simply reduce its transmission power to a level that was previously deemed tolerable, transmit again at block 107 with the new determined power, and re-estimate the link quality at block 108. Alternatively, the full feedback loop 116 can be followed and the third terminal 200 can either start the process again for the same frequency band using an initial low power setting or can decide to try to find another spectrum slot/frequency band.

Based on this additional feature of the invention both terminals 1 and 3 can operate under certain internal cognitive policies without directly changing any control messages to each other. For that reason the two different cognitive systems, terminals 1 & 2 together and terminals 3 & 4 together, do not need to transfer protocol compliant messages with each other.

These teachings are seen to enhance the reliability of the cognitive radio system to allow an additional connection even when the secondary spectrum is crowded. Two different cognitive systems can operate at the same frequency band dynamically even when they do not have compliant messaging protocols. While the link quality estimation is an additional complexity in the cognitive radio terminals, this technology in general requires these terminals to be fairly advanced in order to find and exploit the unused primary spectrum as secondary spectrum, so addition of the link quality estimator and other functions noted herein is not seen to be a practical impediment to implementation.

In general, the various embodiments may be implemented in hardware or special purpose circuits, software (computer readable instructions embodied on a computer readable medium), logic or any combination thereof. For example, some aspects such as the sequence generator may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation such as FIGS. 1 and 4, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits ICs is by and large a highly automated process. Complex and powerful software tools are available for converting a logic level design into a semiconductor circuit design ready to be etched and formed on a semiconductor substrate. FIG. 3 may represent specific circuit functions of such an IC.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims.

We claim:

1. A method comprising:
    at a third communication terminal, determining link quality for a first communication link in use between a first communication terminal and a second communication terminal in a frequency band,
    where the third communication terminal is distinct from the first communication terminal and the second communication terminal;
    determining based on the link quality whether the frequency band can support the first communication link and a second communication link between the third communication terminal and a fourth communication terminal,
    where the frequency band is determined to be able to support the second communication link when interference to be caused by the second communication link is expected to impact the link quality of the first communication link by a tolerable amount; and
    in response to determining that the frequency band can support the second communication link, autonomously transmitting on the second communication link within the frequency band from the third communication terminal to the fourth communication terminal,
    wherein determining the link quality comprises detecting a communication parameter of the first terminal prior to the transmitting and the method further comprises:
    detecting the communication parameter of the first terminal after the transmitting; and
    quantifying interference with the first terminal by comparing the detected communication parameter before the transmitting to the detected communication parameter after the transmitting.

2. The method of claim 1, wherein determining the link quality comprises receiving at the third communication terminal a link quality report.

3. The method of claim 1, wherein determining the link quality comprises estimating the link quality based on a modulation in use between the first communication terminal and the second communication terminal.

4. The method of claim 3, wherein estimating comprises blind modulation detection.

5. The method of claim 1, further comprising receiving a message indicating that the transmitting caused interference and thereafter taking action to reduce or eliminate the interference while the first communication terminal and the second communication terminal remain in communication with one another over the frequency band.

6. The method of claim 5, wherein the message is received from the first communication terminal over a control channel.

7. The method of claim 5, wherein the message is received from an alarm service.

8. The method of claim 5, wherein the action taken comprises one of reducing transmission power or discontinuing transmissions in the frequency band.

9. The method of claim 1, wherein the communication parameter comprises at least one of transmission power, data rate, and modulation.

10. The method of claim 1, further comprising:
    autonomously boosting spectral efficiency at the third terminal in response to the quantified interference exceeding a threshold.

11. The method of claim 1, executed by the third terminal which comprises a cognitive radio operating as a secondary user not under control of a network access node.

12. An apparatus comprising at least one processor; and at least one memory including computer program code, the at least one memory and the computer program code configured to, with the at least one processor, cause the apparatus to perform at least the following:
    to receive information about a first communication link between a first communication terminal and a second communication terminal,
    where the apparatus is distinct from the first communication terminal and the second communication terminal;
    to determine from the received information link quality for the first communication link in a frequency band;
    to autonomously determine based on the link quality whether the frequency band can support the first communication link and a second communication link between the apparatus and a third communication terminal,
    where the frequency band is determined to be able to support the second communication link when interference to be caused by the second communication link is expected to impact the link quality of the first communication link by a tolerable amount; and
    in response to determining that the frequency band can support the second communication link, to transmit on the second communication link within the frequency band to a third communication terminal,
    wherein the at least one memory and the computer program code are further configured to, cause the apparatus:
    to determine link quality by detecting a communication parameter of the first terminal prior to the transmitter transmitting,
    to detect the communication parameter of the first terminal after the transmitter transmitting, and
    to quantify interference with the first terminal by comparing the detected communication parameter before the transmitting to the detected communication parameter after the transmitting.

13. The apparatus of claim 12, wherein the received information comprises a link quality report.

14. The apparatus of claim 12, wherein the received information comprises a signal received from the first terminal directed to the second terminal, and wherein the at least one memory and the computer program code are further configured to, cause the apparatus to determine the link quality by estimating the link quality based on a modulation in use between the first communication terminal and the second communication terminal.

15. The apparatus of claim 14, wherein estimating comprises blind modulation detection.

16. The apparatus of claim 12, wherein the at least one memory and the computer program code are further configured to, cause the apparatus to receive a message indicating that the transmitting caused interference, and, in response, to take action to reduce or eliminate the interference while the first communication terminal and the second communication terminal remain in communication with one another over the frequency band.

17. The apparatus of claim 16, wherein the message is received from the first communication terminal over a control channel.

18. The apparatus of claim 16, wherein the message is received from an alarm service.

19. The apparatus of claim 16, wherein the at least one memory and the computer program code are further configured to, cause the apparatus to take the action by one of reducing transmission power or discontinuing transmissions in the frequency band.

20. The apparatus of claim 12, wherein the communication parameter comprises at least one of transmission power, data rate, and modulation.

21. The apparatus of claim 12, where the at least one memory and the computer program code are further configured to, cause the apparatus to autonomously boost spectral efficiency at the third terminal in response to the quantified interference exceeding a threshold.

22. The apparatus of claim 12, the apparatus comprising a cognitive radio operating as a secondary user not under control of a network access node.

23. A computer readable memory encoded with a computer program executable by a processor to perform actions comprising:
    at a third communication terminal, determining link quality for a first communication link in use between a first communication terminal and a second communication terminal in a frequency band,
    where the third communication terminal is distinct from the first communication terminal and the second communication terminal;
    determining based on the link quality whether the frequency band can support the first communication link and a second communication link between the third communication terminal and a fourth communication terminal,
    where the frequency band is determined to be able to support the second communication link when interference to be caused by the second communication link is expected to impact the link quality of the first communication link by a tolerable amount; and
    in response to determining that the frequency band can support the second communication link, autonomously transmitting on the second communication link within the frequency band from the third communication terminal to the fourth communication terminal,
    wherein determining link quality further comprises detecting a communication parameter of the first terminal prior to the transmitting, the actions further comprising:
    detecting the communication parameter of the first terminal after the transmitting; and
    quantifying interference with the first terminal by comparing the detected communication parameter before the transmitting to the detected communication parameter after the transmitting.

24. The computer readable memory of claim 23, wherein determining link quality comprises estimating the link quality based on blind modulation detection of a modulation in use between the first communication terminal and the second communication terminal.

25. The computer readable memory of claim 23, wherein the communication parameter comprises at least one of transmission power, data rate, and modulation.

26. A method comprising:
    determining, at a cognitive radio, whether a frequency band known to be occupied by a first communication link can support a second communication link without causing an intolerable amount of interference to the first communication link,
    where the first communication link is between a first terminal and a second terminal and the cognitive radio is distinct from the first terminal and the second terminal;
    in response to determining that the frequency band can support the second communication link, transmitting on the second communication link,
    where a modulation used in the first communication link is detected prior to the transmitting;
    in response to transmitting on the second communication, monitoring the first communication link for a change of the modulation used in the first communication link; and
    in response to detecting a change of the modulation, correlating the change of the modulation to an indication of an increase in interference experienced by the first communication link caused by the second communication link and reducing the interference caused by the second communication link.

27. The method of claim 26, further comprising in response to detecting no change of the modulation, increasing a transmission power used for the second communication link and continuing transmitting on the second communication link.

* * * * *